(12) United States Patent
Lim et al.

(10) Patent No.: US 8,743,904 B2
(45) Date of Patent: Jun. 3, 2014

(54) DATA TRANSMISSION METHOD ACCORDING TO RADIO RESOURCE ALLOCATION IN MULTI-HOP RELAY SYSTEM

(75) Inventors: Dong-Guk Lim, Gyeonggi-Do (KR); Han-Gyu Cho, Gyeonggi-Do (KR); Jong-Young Han, Gyeonggi-Do (KR); Jin-Sam Kwak, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 235 days.

(21) Appl. No.: 13/126,913

(22) PCT Filed: Nov. 2, 2009

(86) PCT No.: PCT/KR2009/006393
§ 371 (c)(1),
(2), (4) Date: Apr. 29, 2011

(87) PCT Pub. No.: WO2010/062050
PCT Pub. Date: Jun. 3, 2010

(65) Prior Publication Data
US 2011/0216691 A1 Sep. 8, 2011

Related U.S. Application Data

(60) Provisional application No. 61/110,561, filed on Nov. 1, 2008.

(30) Foreign Application Priority Data

Nov. 2, 2009 (KR) .................. 10-2009-0104869

(51) Int. Cl.
*H04J 3/16* (2006.01)
*H04W 72/04* (2009.01)
*H04W 74/00* (2009.01)
*H04W 28/26* (2009.01)
*H04J 11/00* (2006.01)
*H04L 12/56* (2006.01)

(52) U.S. Cl.
CPC ............ *H04W 72/04* (2013.01); *H04W 74/002* (2013.01); *H04W 28/26* (2013.01); *H04J 11/0023* (2013.01); *H04L 47/32* (2013.01)
USPC .......................... 370/468; 370/230.1; 370/310

(58) Field of Classification Search
CPC ... H04W 28/26; H04W 72/04; H04W 74/002; H04J 11/0023; H04L 47/32
See application file for complete search history.

(56) References Cited

U.S. PATENT DOCUMENTS

| 2008/0130550 | A1 | 6/2008 | Kim et al. |
| 2008/0212516 | A1* | 9/2008 | Son et al. ...................... 370/315 |
| 2008/0267110 | A1 | 10/2008 | Cai et al. |

(Continued)

FOREIGN PATENT DOCUMENTS

EP     1981223 A1     10/2008

*Primary Examiner* — Andrew Chriss
*Assistant Examiner* — Salvador E Rivas
(74) *Attorney, Agent, or Firm* — Birch, Stewart, Kolasch & Birch, LLP

(57) ABSTRACT

A data transmission method in a system comprising at least one or more relays includes transmitting by a mobile station a bandwidth allocation request message to a relay, receiving by the mobile station a bandwidth allocation message from the relay, the bandwidth allocation message including information for indicating an offset from a frame where the bandwidth allocation message is contained, waiting by the mobile station for an uplink frame or uplink subframe indicated by the offset from the frame where the bandwidth allocation message is contained, and transmitting data on the indicated frame or subframe.

15 Claims, 9 Drawing Sheets

(56) References Cited

U.S. PATENT DOCUMENTS

| | | | |
|---|---|---|---|
| 2009/0022101 A1* | 1/2009 | Min et al. | 370/329 |
| 2009/0067364 A1* | 3/2009 | Chang et al. | 370/315 |
| 2009/0092090 A1* | 4/2009 | Beems Hart et al. | 370/329 |
| 2009/0203309 A1* | 8/2009 | Okuda | 455/7 |
| 2010/0246475 A1* | 9/2010 | Naden et al. | 370/315 |
| 2011/0116485 A1* | 5/2011 | Olszewski et al. | 370/338 |

* cited by examiner

Bidirectional Zone
Division into DL/UL access zones

DATA TRANSMISSION METHOD ACCORDING TO RADIO RESOURCE ALLOCATION IN MULTI-HOP RELAY SYSTEM

This application is the National Phase of PCT/KR2009/006393 filed on Nov. 2, 2009, which claims the benefit under 35 U.S.C. 119(e) of U.S. Provisional Application No. 61/110,561 filed on Nov. 1, 2008, and claims priority under 35 U.S.C. 119 (a) to Patent Application No. 10-2009-0104869 filed in Republic of Korea on Nov. 2, 2009, all of which are hereby expressly incorporated by reference into the present application.

TECHNICAL FIELD

This specification relates to a multi-hop relay system.

BACKGROUND ART

Second generation mobile communication refers to transmission and reception of voice into digital and is represented by Code Division Multiple Access (CDMA), Global System for Mobile communication (GSM) and the like. General Packet Radio Service (GPRS) was evolved from the GSM. The GPRS is a technology for providing a packet switched data service based on the GSP system.

Third Generation mobile communication refers to transmission and reception of image and data as well as voice (audio). Third Generation Partnership Project (3GPP) has developed a mobile communication system (i.e., International Mobile Telecommunications (IMT-2000)), and adapted Wideband-CDMA (WCDMA) as Radio Access Technology (RAT). The IMT-200 and, the RAT, for example, the WCDMA are called as Universal Mobile Telecommunication System (UMTS) in Europe. Here, UTRAN is an abbreviation of UMTS Terrestrial Radio Access Network.

A common cellular network constructs a radio communication link with high inter-reliability by a central cell design that communications are enabled via a direct link between a base station and a mobile terminal (mobile station) within a cell that the base station covers. However, service frequency ranges are getting extended in the recent communication networks and radiuses of cells are gradually decreased for supporting (covering) high-speed communication and more traffic. Thus, many problems may be caused in view of applying the conventional centralized cellular radio network as it is even later. That is, since a position of the base station is fixed, flexibility of a radio link configuration is low. As a result, it has been difficult to efficiently provide communication services in a radio (wireless) environment where there is a rapid change in traffic distribution and call demands.

Therefore, the next generation communication system should be distributively controlled and constructed, and also actively meet environmental changes, such as addition of a new base station.

To address this shortcoming, a multi-hop relay system has been introduced. Advantageously, the multi-hop relay system can broaden cell service coverage by covering a partial shadow area generated within a cell region, increase system capacity, and reduce an initial installation charge since a relay (hereinafter, referred to as 'relay station (RS)') is established in an initial stage when a service request is not frequently made. The relay system may relay a signal of a mobile station (MS) to a base station (BS) via a relay station (RS) when the MS is located far away from the BS or a signal transmission is not smoothly performed due to an obstacle such as buildings or the like, thereby broadening the cell coverage and solving the shadow area.

FIG. 1 illustrates a multi-hop relay system.

As illustrated in FIG. 1, an MS 11 within the coverage area of a BS 30 is connected to the BS 30 through a direct link, and an MS 12, which is located outside the coverage area of the BS 30 and thus has a poor channel quality with respect to the BS 30, is connected to the BS 30 through an RS 20.

Here, the RS 20 is located on a roof of a building, relatively higher than the MS 10, and fixedly installed thereat. Hence, the channel environment between the RS 20 and the BS 30 has less change than the channel between the MS 11 and the RS 20, and achieves a high channel gain on the average.

Since the RS is established between the BS and the MS for signal relay, a BS-MS link, a BS-RS link and an RS-MS link are established. Such link is referred to as hop. That is, when the MS is located in a cell boundary region of the BS or in a shadow area suffering a serious shielding phenomenon due to buildings, the MS may perform communications with the BS through the RS. Thus, by using the relay scheme, the BS can provide a high-speed data channel in the cell boundary region in a poor channel quality and also can extend the cell service coverage.

A plurality of RSs may be present according to a channel between the MS and the BS or the RS and other conditions, which is referred to as 'multi-hop relay system.'

In the multi-hop relay system, when a plurality of RSs are sequentially connected, a relay station (RS) which controls and supports subordinately connected MS and RS is referred to as a superordinate RS, and a relay station (RS) which is connected to the superordinate RS and supports the MS is referred to as a subordinate RS.

As such, the relay-employed environments are discussed even in the WiMAX standard as the next generation mobile communication system.

The WiMAX standard has adapted introduction of the RS, and discussed a centralized scheduling-based multi access scheme that the BS directly performs scheduling and a distributed scheduling-based multi access scheme that the BS and the RS distributively perform scheduling, respectively.

FIG. 2 illustrates an exemplary frame structure used in the multi-hop relay system.

Referring to FIG. 2, a superframe is divided into four radio frames each having the same size. The superframe may include a superframe header. The superframe header may include essential control information that an MS should acquire upon an initial network entry or handover, and function similar to a Broadcast Channel (BCH) in the LTE technology. The superframe header may be assigned to a first radio frame of a plurality of radio frames constituting a superframe. The number of subframes constituting one frame may be variable to 5, 6, 7 or 8 depending on a bandwidth of a system or a length of a cyclic prefix (CP), and the number of symbols of OFDMA constituting one subframe may also be variable to 5, 6, 7 or 9. FIG. 2 exemplarily illustrates that the length of CP is ⅛ Tb (Tb: Useful OFDMA symbol time) when a bandwidth is 5, 10 or 20 MHz.

The frame structure exemplarily illustrated in FIG. 2 may be applied to a Time Division Duplexing (TDD) or Frequency Division Duplexing (FDD) scheme. In the TDD, an entire frequency band is used for uplink (UL) or downlink (DL) transmission but is divided into UL transmission and DL transmission at a time domain. In the FDD scheme, UL transmission and DL transmission occupy different frequency bands and can be simultaneously performed.

FIG. 3 illustrates a relay frame structure in accordance with one exemplary embodiment.

The frame structure illustrated in FIG. 3, is illustrated based on one example among structures proposed in IEEE 802.16.

According to the illustrated frame structure, an RS, a BS and an MS may perform merely unidirectional transmission or reception at the same time domain, which is referred to as a unidirectional mode. Also, regarding the illustrated frame structure, RSs are divided into an odd-hop RS and an even-hop RS according to the number of hops from the BS.

A DL subframe of an odd-hop RS may include 16 m transmit zone and 16 m DL receive zone in order, and a UL resource of the odd-hop RS may include 16 m UL receive zone and 16 m UL transmit zone in order.

A DL subframe of an even-hop RS may include 16 m DL receive zone and 16 m transmit zone, and a UL subframe of the even-hop RS may include 16 m UL transmit zone and 16 m UL receive zone in order.

The 16 m DL transmit zone is a DL period of an RS, and the RS may perform transmission to a subordinate RS and an MS.

The 16 m DL receive zone is a DL period of an RS, and the RS may perform reception from a superordinate RS.

The 16 m UL transmit zone is a UL period of an RS, and the RS may perform transmission to a superordinate RS and an MS.

The 16 m UL receive zone is a UL period of the RS, and the RS may perform reception from a subordinate RS and an MS.

Meanwhile, a DL subframe of a BS may include a zone between RS and MS (indicates by BS☐MS) and 16 m DL relay zone. The DL relay zone is a DL period of the BS, and the BS may perform transmission to an RS and an MS. A UL subframe of the BS may include a zone between RS and MS (indicated by BS☐MS) and a UL relay zone. The UL relay zone is a UL period of the BS, and the BS may perform reception from an RS and an MS.

FIG. 4 illustrates another exemplary relay frame structure.

The frame structure illustrated in FIG. 4 is illustrated based on another example among the structures proposed in IEEE 802.16.

According to the illustrated frame structure, an RS may perform transmission or reception bi-directionally, namely, to or from a BS and a subordinate RS at the same time domain. This is referred to as a bi-directional mode. The relay frame structure may include a bi-directional transmit zone and a bi-directional receive zone. In the bi-directional transmit zone, the RS may perform transmission to a superordinate RS/BS and a subordinate RS. In the bi-directional receive zone, the RS may receive data from a subordinate RS and a superordinate RS/BS.

In 16 m DL access zone as illustrated in FIG. 4, a BS or RS may perform transmission to an MS. In 16 m UL access zone, a BS or RS may receive data from an MS.

FIG. 5 illustrates another exemplary relay frame structure.

The frame structure illustrated in FIG. 5 is illustrated according to a connection among a BS, a non-transparent relay and a transparent relay.

The transparent RS may not generate and transmit its own control signal, for example, preamble, FCH, MAP, DCD/UCD, SFH, etc. On the other hand, the non-transparent RS may directly generate its own control signal for transmission.

The transparent RS may be connected to a BS, and the non-transparent RS may be subordinately connected to the transparent RS.

DISCLOSURE OF THE INVENTION

In the related art, an MS may request a radio resource, for example, a bandwidth, directly from a BS, and be allocated a radio resource, for example, a bandwidth, directly from the BS. However, when an RS is connected to the BS and a subordinate RS or MS is connected to the RS, a process that the MS performs a bandwidth allocation request and the BS allocates the bandwidth has not been introduced yet.

Therefore, an aspect of this specification is to provide a detailed procedure therefor.

To achieve these and other advantages and in accordance with the purpose of the present invention, as embodied and broadly described herein, there is provided a data transmission method in a system comprising at least one or more relays. The method may include transmitting by a mobile station a bandwidth allocation request message to a relay, receiving by the mobile station a bandwidth allocation message from the relay, the bandwidth allocation message including information for indicating an offset from a frame where the bandwidth allocation message is contained, waiting by the mobile station for an uplink frame or uplink subframe indicated by the offset from the frame where the bandwidth allocation message is contained, and transmitting data on the indicated frame or subframe.

The bandwidth allocation request message may be a BW Request message, and the bandwidth allocation message may be UL-MAP.

The offset may indicate at least one previous frame or subframe of the frame where a radio resource allocated from the base station to the relay is present.

The data may be user data or a control signal, for example positive acknowledgement (ACK)/negative acknowledgement (NACK).

To achieve the above aspect, there is provided a terminal. The terminal may include a transceiver configured to transmit a bandwidth allocation request message to a relay and receive a bandwidth allocation message from the relay, the bandwidth allocation message including information for indicating an offset from a frame where the bandwidth allocation message is contained, and a controller configured to wait for an uplink frame or uplink subframe indicated by the offset from the frame where the bandwidth allocation message is contained, and if reaching the indicated frame or subframe, control the transceiver to transmit data on the frame or subframe.

ADVANTAGEOUS EFFECT

This specification allows a base station to allocate radio resources by considering the number of hops in a multi-hop relay system, thereby minimizing or preventing abnormal use or consumption of radio resources. Also, this specification allows the base station to allocate radio resources by considering a time delay in the multi-hop relay system, thereby minimizing unnecessary consumption of radio resources.

MODES FOR CARRYING OUT THE PREFERRED EMBODIMENTS

Figure 1:
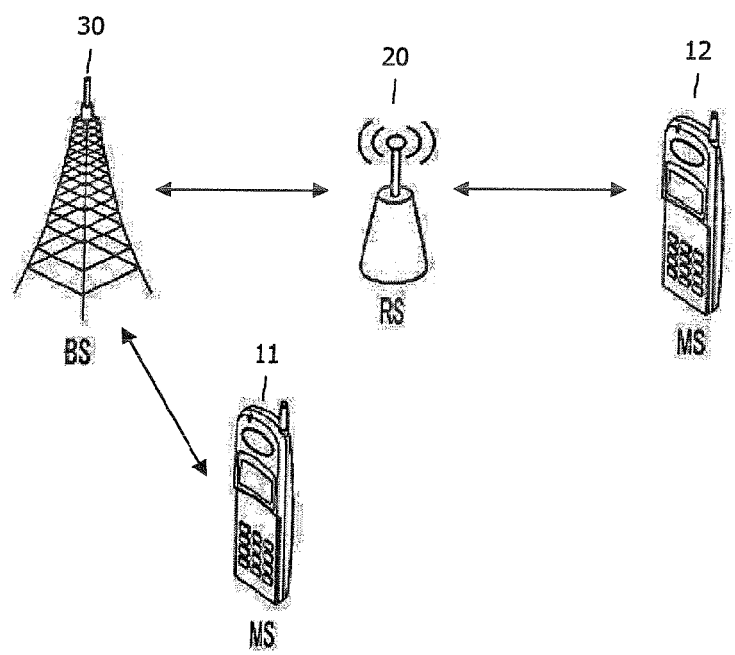
FIG. 1 illustrates a multi-hop relay system.
Figure 2:
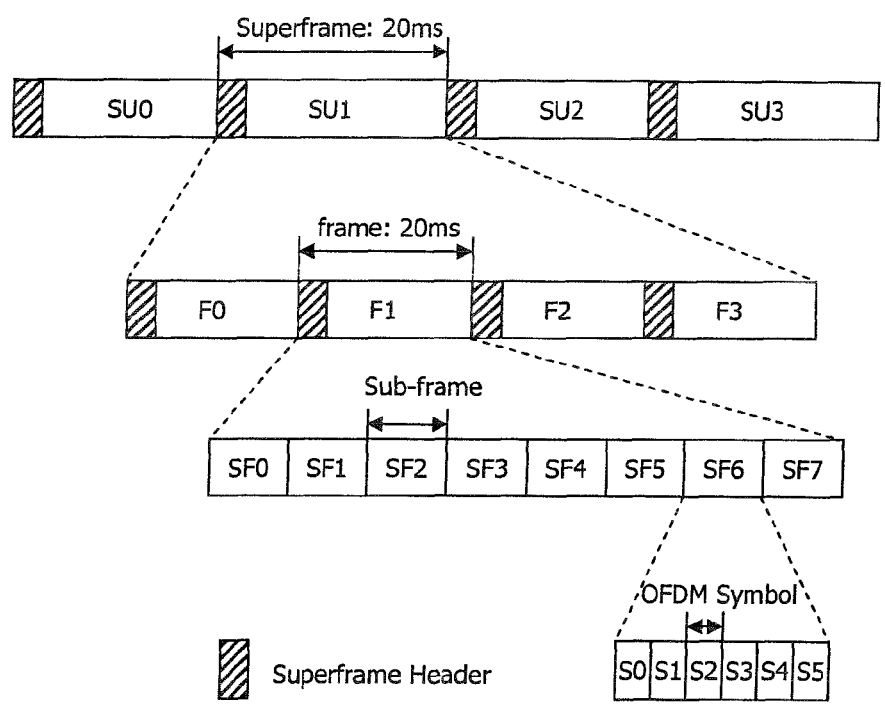
FIG. 2 illustrates an exemplary frame structure used in the multi-hop relay system.
Figure 3:
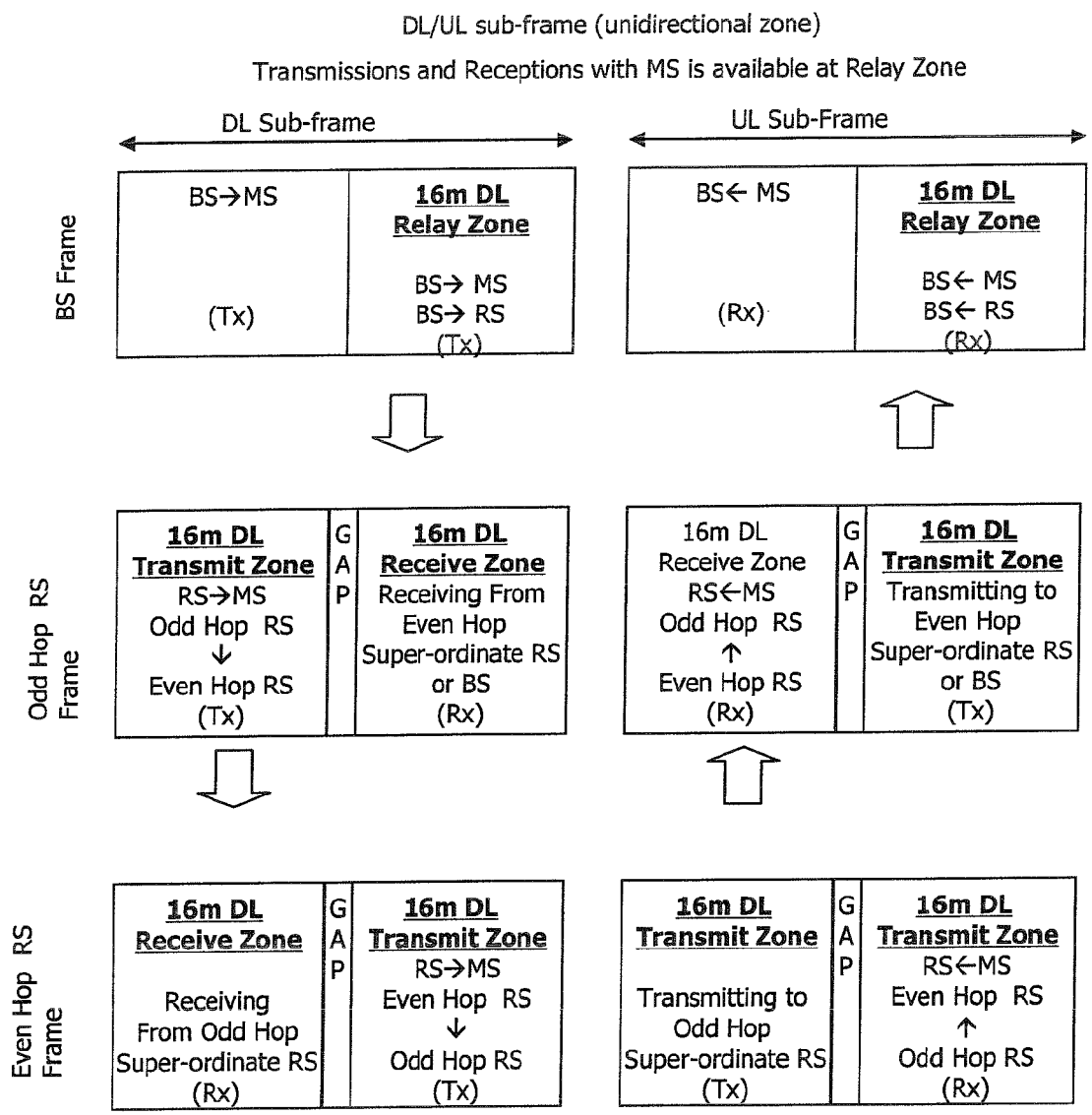
FIG. 3 illustrates an exemplary relay frame structure.
Figure 4:
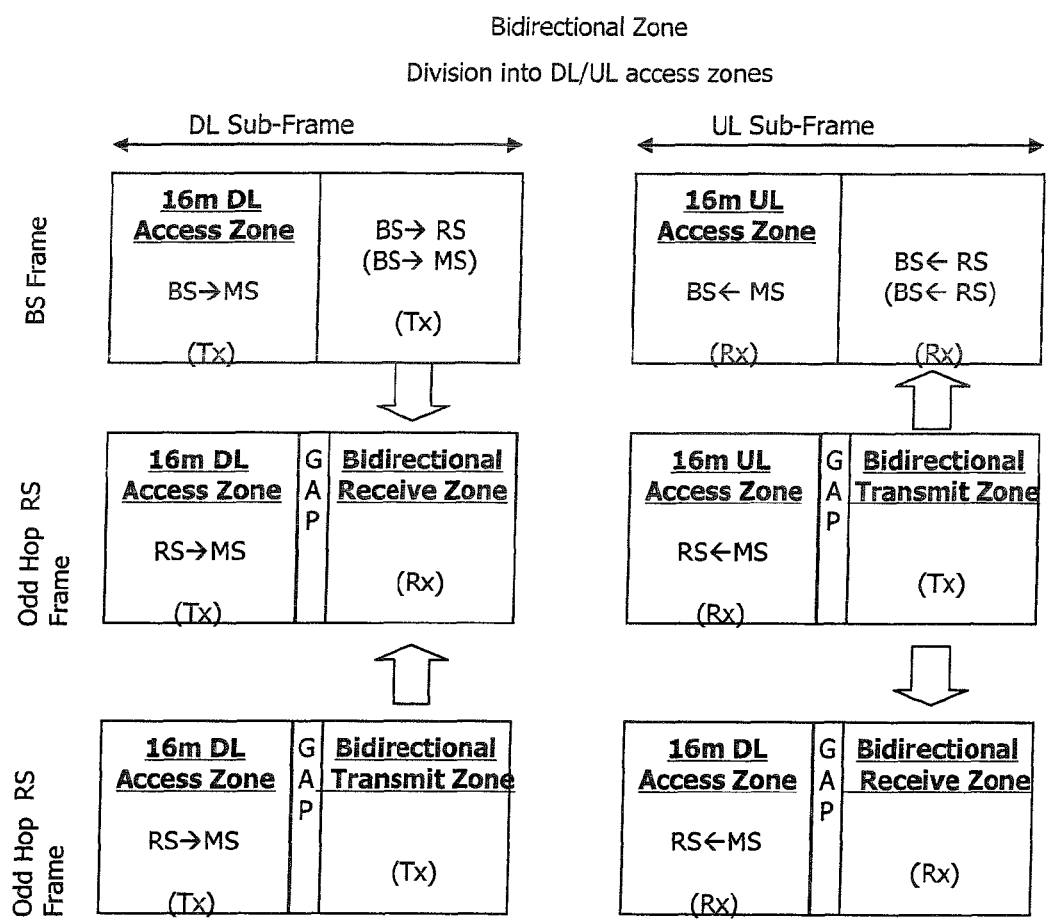
FIG. 4 illustrates another exemplary relay frame structure.
Figure 5:
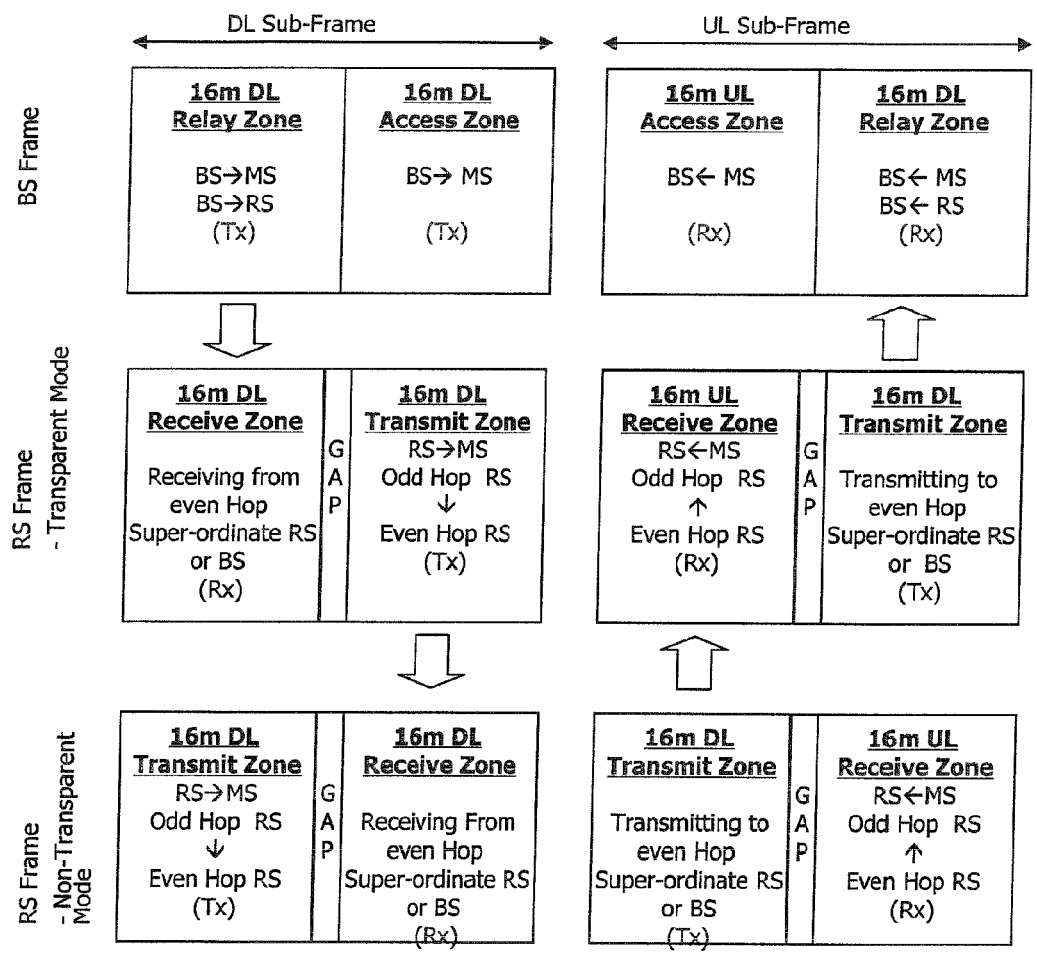
FIG. 5 illustrates another exemplary relay frame structure.

This specification may be applied to any communication system, for example, 3GPP Long Term Evolution (LTE), IEEE standard and Ad-Hoc network, to which the technical scope of the present disclosure is applicable.

Technical terms used in this specification are used to merely illustrate specific embodiments, and should be understood that they are not intended to limit the present disclosure. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

It will be understood that when an element is referred to as being "connected with" another element, the element can be directly connected with the other element or intervening elements may also be present. In contrast, when an element is referred to as being "directly connected with" another element, there are no intervening elements present.

Embodiments of the present invention will be described below in detail with reference to the accompanying drawings where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

The term 'terminal' is used herein, but the terminal may be replaced with other terms, such as User Equipment (UE), Mobile Equipment (ME), Mobile Station (MS) and the like. Also, the terminal may be a type of portable equipment, such as a cellular phone, PDA, a smart phone, a notebook and the like, or a type of fixed equipment, such as PC, vehicle-mounted device and the like.

Figure 6:
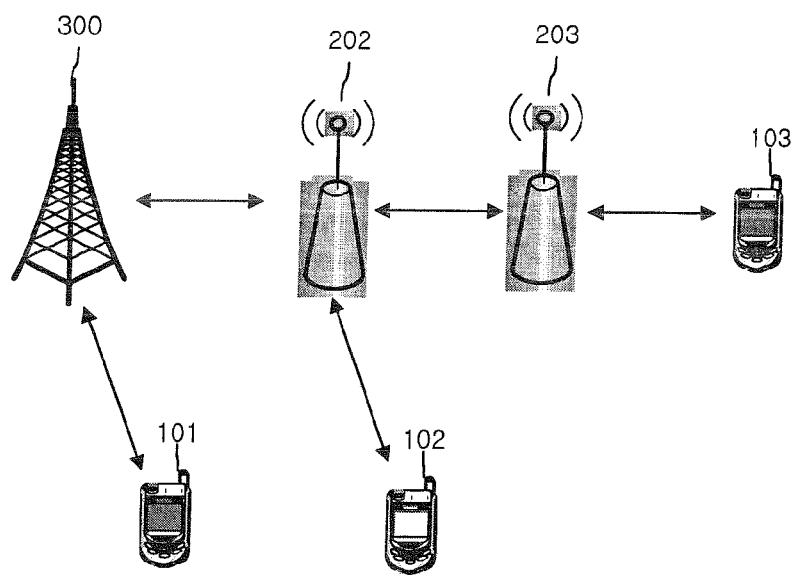
FIG. 6 illustrates a multi-hop relay system in accordance with this specification.
Figure 7:
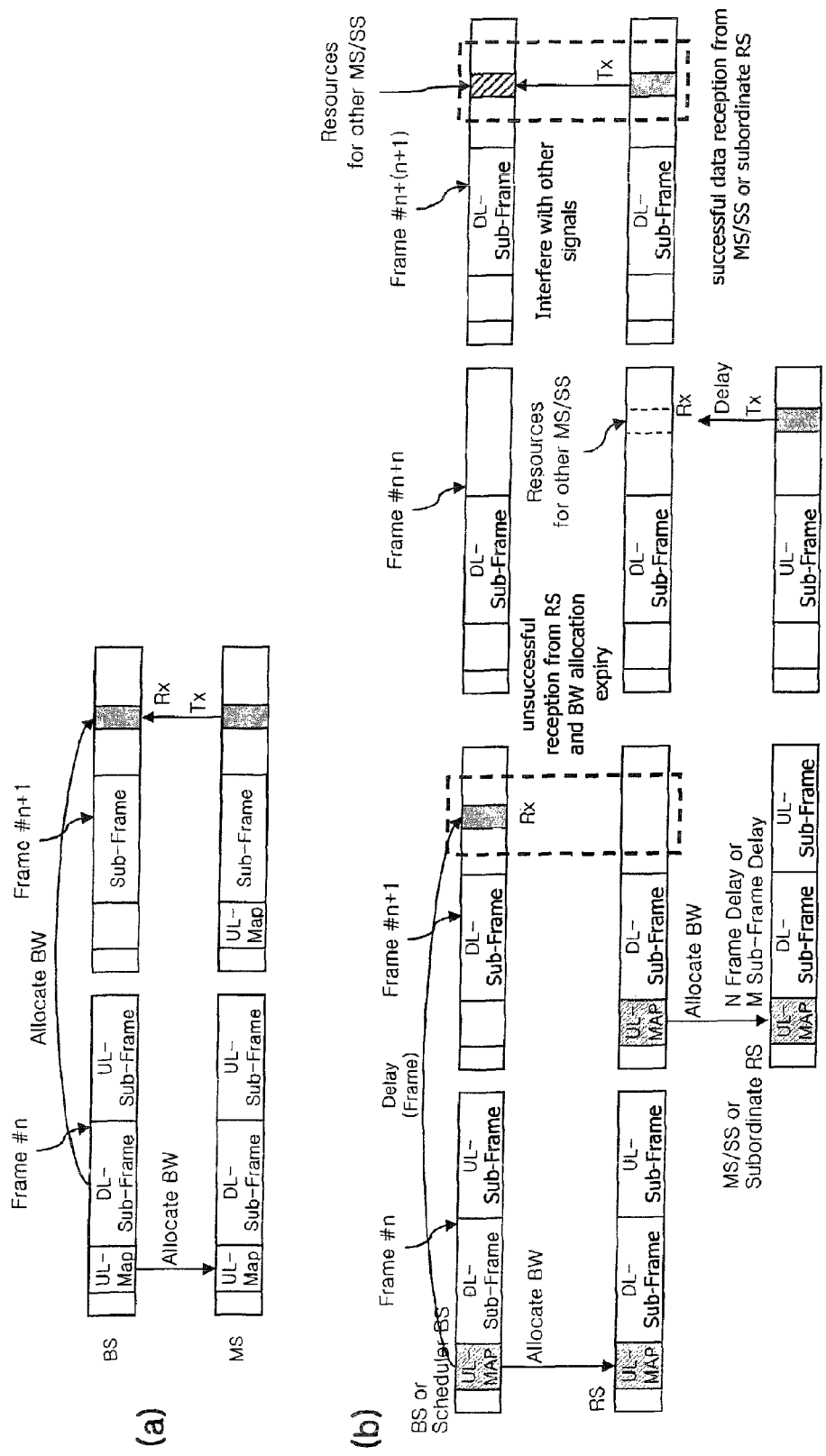
FIG. 7 illustrates an exemplary embodiment of a radio resource allocation method in the multi-hop relay system illustrated in FIG. 6.

FIG. 6 illustrates a multi-hop relay system in accordance with this specification, and FIG. 7 illustrates an exemplary embodiment of a radio resource allocation method in the multi-hop relay system illustrated in FIG. 6.

As illustrated in FIG. 6, a first relay station (RS) 202 may be connected to a base station (BS) 300, and a second RS may be connected to the first RS 202. The first RS 202 corresponds to a superordinate RS, and the second RS 203 corresponds to a subordinate RS as aforesaid. Here, the first RS 202 may correspond to a transparent RS, and the second RS may correspond to a non-transparent RS.

A first mobile station (MS) 100 may be connected directly to the BS 300. A second MS 102 may be connected to the first RS 202 connected to the BS 300. A third MS 103 may be connected to the second RS 203. The second RS 203 may be connected to the first RS 202.

FIG. 7A exemplarily illustrates that the BS 300 allocates a resource to the first RS 202 or the first MS 101.

Referring to FIG. 7A, when the first RS 202 or the first MS 101 transmits a resource allocation request, namely, a bandwidth (BW) allocation request, the BS 300 may allocate the BW via a BW allocation message or a UL radio resource information message, for example, UL-MAP. The radio resource, which is indicated by the BW allocation message or the UL radio resource information message, for example, UL-MAP, is the next frame of a frame where the UL-MAP was received. That is, when the BW allocation is performed in an $n^{th}$ frame, the radio resource indicated by the UL-MAP is $n+1^{th}$ frame.

The first RS 202 or the first MS 101 may transmit data on the next frame of the frame where the BW allocation message or the UL radio resource information message, for example, UL-MAP was received.

FIG. 7B exemplarily illustrates resource allocations between the BS 300 and the first RS 202, the second RS 203 or the second MS 102.

Referring to FIG. 7B, as the same in FIG. 7A, a radio resource, which is indicated by the BW allocation message or the UL radio resource information message, for example, UL-MAP, is a radio resource on the next frame of the frame where the UL-MAP was received. In other words, the BS 300 may transmit the BW allocation message or the UL radio resource information message, for example, UL-MAP, to the first RS 202 on the $n^{th}$ frame.

However, the first RS 202 may receive the BW allocation message or the UL radio resource information message, for example, UL-MAP, on the $n^{th}$ frame, and thereafter deliver the UL-MAP to the second RS 203 or the second MS 102 in a DL subframe of the $n+1^{th}$ frame.

Upon reception of the BW allocation message or the UL radio resource information message, for example, UL-MAP, the second RS 203 or the second MS 102 may attempt to transmit data on the next frame of the frame where the UL-MAP was received.

However, the time point when the first RS 202 receives the data from the second RS 203 or the second MS 102 is the $n+2^{th}$ frame. Here, the radio resource on the $n+2^{th}$ frame may be the same as a radio resource having allocated to another MS or another RS. Hence, the first RS 202 may not correctly receive the data.

Alternatively, when the first RS 202 correctly received the data, the first RS 202 may deliver the data to the BS 300 on the $n+(n+1)^{th}$ frame. Even at this time, the radio resource on the $n+(n+1)^{th}$ frame may be the same as a radio resource having allocated to another MS or another RS. Therefore, the BS 300 may not correctly receive the data.

Thus, when the BW allocation message or the UL radio resource information message, for example, UL-MAP indicates a radio resource on the next frame, transmission and reception may not be performed correctly in the multi-hop relay system.

Figure 8:
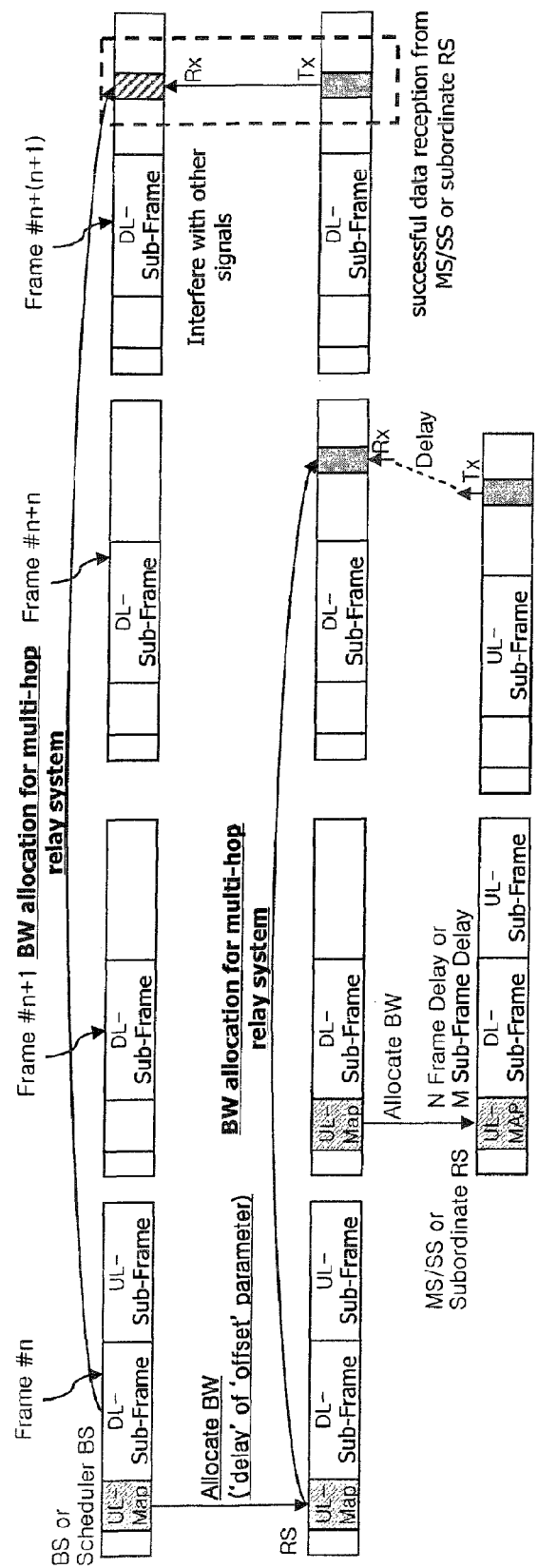
FIG. 8 illustrates an exemplary embodiment of an optimized radio resource allocation method in the multi-hop relay system illustrated in FIG. 6.

FIG. 8 illustrates an exemplary embodiment of an optimized radio resource allocation method in the multi-hop relay system illustrated in FIG. 6.

According to the radio resource allocation method illustrated in FIG. 8, the BS 300 may decide a radio resource to allocate by considering the number of hops of the first MS 101, the second MS 102 and the third MS 103. That is, the BS 300 allocates a time for receiving data of each MS, namely, a radio resource of a frame, by considering the number of hops. Information related to the allocated radio resource may be transmitted via a BW allocation message or a UL radio resource information message, for example, UL-MAP. The information included in the BW allocation message or the UL radio resource information message, for example, UL-MAP, may include an offset from a frame or subframe where the UL-MAP is received to the allocated radio resource. The offset may have a value of a subframe unit (for example, n+30 subframes) or a value of a frame unit. Alternatively, the offset may have a value obtained by combination of frame and subframe (for example, frame offset=3 & subframe offset=6).

Alternatively, the offset may indicate the number of hops. For example, as illustrated in FIG. 6, when data of the third MS 103 reaches the BS 300 via the two RSs 202 and 203, the offset value may be 3.

The second RS 203 may transmit the radio resource allocation message or a link radio resource information message, for example, UL-MAP, to the third MS 103. Here, the second RS 203 may generate a new offset based upon an offset contained within the radio resource allocation message or a link radio resource information message (for example, UL-MAP), and transmit the UL-MAP including the newly generated offset to the third MS 103. For example, when the offset received from the BS 300 indicates 3 frames, the second RS 203 may update the offset to two frames if the second RS 203 should receive data from the third MS 103 before two frames are over in order to transmit data to the BS 300.

Accordingly, the third MS 103 waits for a frame indicated by the offset from the frame or subframe, and then transmits its own data.

Alternatively, the third MS 103 may transmit its data before the frame or subframe indicated by the offset, in consideration of time delay.

Meanwhile, it is assumed that the first RS 202 operates by a distributed scheduling scheme. Here, the first RS 202, as similar to the BS 300, may include the offset in the BW allocation message or the UL radio resource information message, for example, UL-MAP.

The conception of this specification may be applied even to Hybrid-Automatic Retransmit reQuest (HARQ). For example, when MS transmits a positive acknowledgement (ACK) and a negative acknowledgement (NACK) with respect to data received from BS, the conception of this specification may be applied. In detail, it is assumed that the BS 300 is connected to the first RS 202, the first RS 202 is connected to the second RS 203 and the second RS 203 is connected to an MS 100. It is also assumed that the BS 300 has transmitted first data, second data and third data. Accordingly, the BS 300 should allocate a radio resource for the MS 100 to receive ACK/NACK with respect to those data. Here, the BS 300, as illustrated in FIG. 8, may transmit the BW allocation message or the UL radio resource information message, for example, UL-MAP, which indicates a frame off set, for the ACK/NACK.

The present disclosure may be applied to any data transmission and reception, to which the conception of this specification is applicable.

Meanwhile, the method according to the present disclosure, as described so far, can be implemented by hardware or software, or any combination thereof. For example, the method according to the present disclosure may be stored in a storage medium (e.g., a memory, a hard disc, etc.). Alternatively, the method according to the present disclosure can be implemented as codes or command words within a software program capable of being executed by a processor. This implementation will be described with reference to FIG. 9 as follows.

Figure 9:
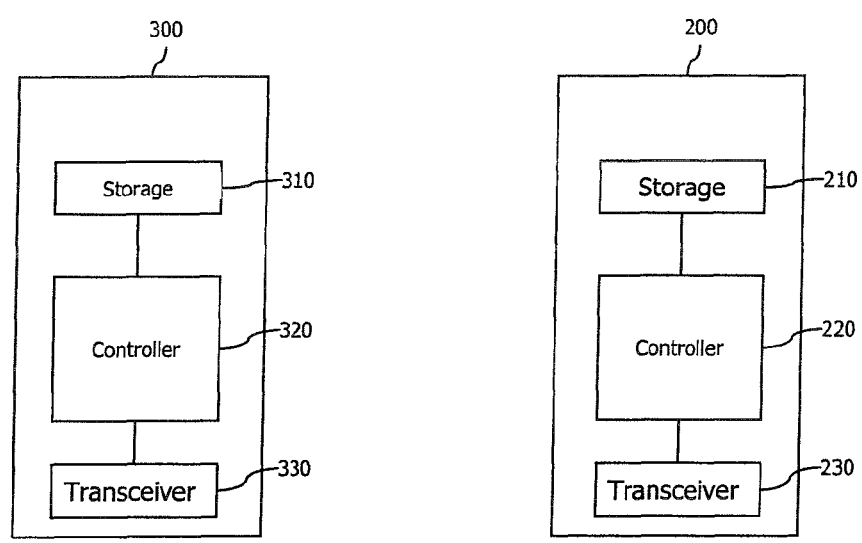
FIG. 9 illustrates a configuration of a base station and a relay station in accordance with this specification.

FIG. 9 illustrates a configuration of BS and RS in accordance with this specification.

As illustrated in FIG. 9, each of the BS and the RS may include a controller, a memory and a transceiver. The memory may store a software program in which the aforesaid method is implemented, and the controller may execute the method within the memory. The transceiver may be controlled by the controller to transmit and receive the BW allocation message or the UL radio resource information message, for example, UL-MAP, as described above.

The present invention has been explained with reference to the embodiments which are merely exemplary. It will be apparent to those skilled in the art that various modifications and equivalent other embodiments can be made in the present invention without departing from the spirit or scope of the invention. Also, it will be understood that the present invention can be implemented by selectively combining the aforementioned embodiment(s) entirely or partially. Thus, it is intended that the present invention cover modifications and variations of this invention provided they come within the scope of the appended claims and their equivalents.

The invention claimed is:

1. A data transmission method in a wireless access system comprising one or more relay stations (RSs), the method performed by a mobile station (MS) and comprising:
    transmitting a bandwidth allocation request message to a RS, the bandwidth allocation request message including information which requests resource allocation;
    receiving a bandwidth allocation message from the RS, the bandwidth allocation message including information indicating a frame offset from a frame where the bandwidth allocation message is contained; and
    transmitting data on an uplink frame indicated by the frame offset,
    wherein the frame offset is reconfigured at the RS considering delay time in transmission of the bandwidth allocation message between a base station (BS) and the RS and considering a number of hops between the MS and the BS.

2. The method of claim 1, wherein the bandwidth allocation request message is a BW Request message.

3. The method of claim 1, wherein the bandwidth allocation message is UL-MAP.

4. The method of claim 1, wherein the frame offset indicates at least one previous frame of the frame where a radio resource allocated from the BS to the RS is present.

5. The method of claim 1, wherein the data is user data or a control signal.

6. A terminal for transmitting data in a wireless access system comprising one or more relay stations (RSs), the terminal comprising:
   a transceiver to transmit and receive signals; and
   a controller configured to:
   transmit a bandwidth allocation request message to a RS, the bandwidth allocation request message including information which requests resource allocation;
   receive a bandwidth allocation message from the RS, the bandwidth allocation message including information indicating a frame offset from a frame where the bandwidth allocation message is contained; and
   transmit data on an uplink frame indicated by the frame offset,
   wherein the frame offset is reconfigured at the RS considering delay time in transmission of the bandwidth allocation message between a base station (BS) and the RS and considering a number of hops between the MS and the BS.

7. The terminal of claim 6, wherein the bandwidth allocation request message is a BW Request message.

8. The terminal of claim 6, wherein the bandwidth allocation message is UL-MAP.

9. The terminal of claim 6, wherein the frame offset indicates at least one previous frame of the frame where a radio resource allocated from the BS to the RS is present.

10. The method of claim 1, wherein the number of hops is a sum of a number of links including a MS-RS link, a RS-BS link, or a RS-RS link between the MS and the BS.

11. The method of claim 1, wherein the frame offset is the number of hops between the MS and the BS.

12. The method of claim 1, wherein the bandwidth allocation message further includes information indicating a subframe offset from a subframe where the bandwidth allocation message is contained.

13. The terminal of claim 6, wherein the number of hops is a sum of a number of links including a MS-RS link, a RS-BS link, or a RS-RS link between the MS and the BS.

14. The terminal of claim 6, wherein the frame offset is the number of hops between the MS and the BS.

15. The terminal of claim 6, wherein the bandwidth allocation message further includes information indicating a subframe offset from a subframe where the bandwidth allocation message is contained.

* * * * *